(Model.)

DE WITT C. MARKHAM.
MOWER.

No. 265,525.

4 Sheets—Sheet 1.

Patented Oct. 3, 1882.

Witnesses:
F. L. Durand
Jno. R. Young

Inventor:
Dewitt C. Markham
by W. H. Doolittle,
Attorney (Model.)

DE WITT C. MARKHAM.
MOWER.

No. 265,525.

4 Sheets—Sheet 2.

Patented Oct. 3, 1882.

Witnesses:
F. L. Durand
Jno. R. Young.

Inventor:
Dewitt C. Markham
by W. H. Doolittle
Attorney.

(Model.)        DE WITT C. MARKHAM.        4 Sheets—Sheet 3.

MOWER.

No. 265,525.        Patented Oct. 3, 1882.

(Model.) 4 Sheets—Sheet 4.
DE WITT C. MARKHAM.
MOWER.
No. 265,525. Patented Oct. 3, 1882.
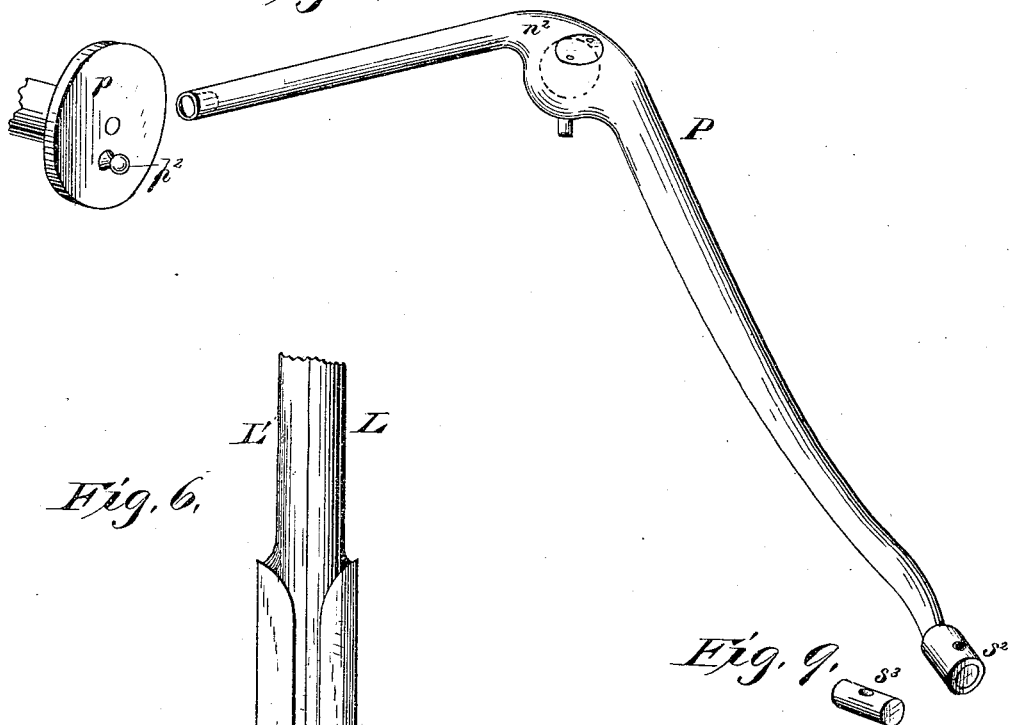
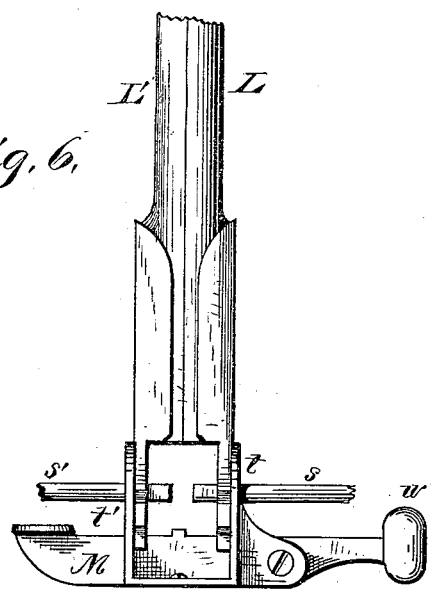
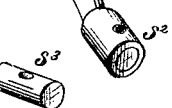
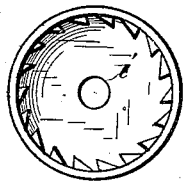
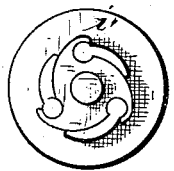
Witnesses:
F. L. Durand
Jno. R. Young
Inventor:
Dewitt C. Markham
by W. M. Doolittle
Attorney
N. PETERS. Photo-Lithographer, Washington, D. C.

UNITED STATES PATENT OFFICE.

DEWITT C. MARKHAM, OF COLLINSVILLE, NEW YORK.

MOWER.

SPECIFICATION forming part of Letters Patent No. 265,525, dated October 3, 1882.

Application filed January 4, 1882. (Model.)

*To all whom it may concern:*

Be it known that I, DEWITT C. MARKHAM, a citizen of the United States, residing at Collinsville, in the county of Lewis and State of New York, have invented certain new and useful Improvements in Mowers; and I do hereby declare the following to be a full, clear, and exact description of the invention, such as will enable others skilled in the art to which it appertains to make and use the same.

This invention relates to certain novel improvements in direct-draft mowing-machines; and the objects to be accomplished are to transfer all weight and strain from the cutter-bar and side arms to platform and main axle, and thus at all times keep the cutter-bar perfectly balanced; to provide more convenient and efficient means of independently raising one end of the cutter-bar and the frame, raising both jointly, and fixing either or both at a desired height when raised; to dispense with the form of pitman now generally in use and substitute therefor a bent arm pivoted at or near the main axle; to arrange the bearing and connections of the knife or cutter-bar on a direct line therewith; to improve the form of lead-wheels; to prevent cramping of the cutter-bar as it is moved up and down by changing the connection of cutter-bar with right side arm; to simplify and improve the means of varying the height of cut; to better adapt the machine for mowing grain; to improve the form of tongue and the means for connecting it with the platform, and to improve the machine in minor details, as hereinafter described. I attain these objects by the mechanism illustrated in the accompanying drawings, in which—

Figure 1:
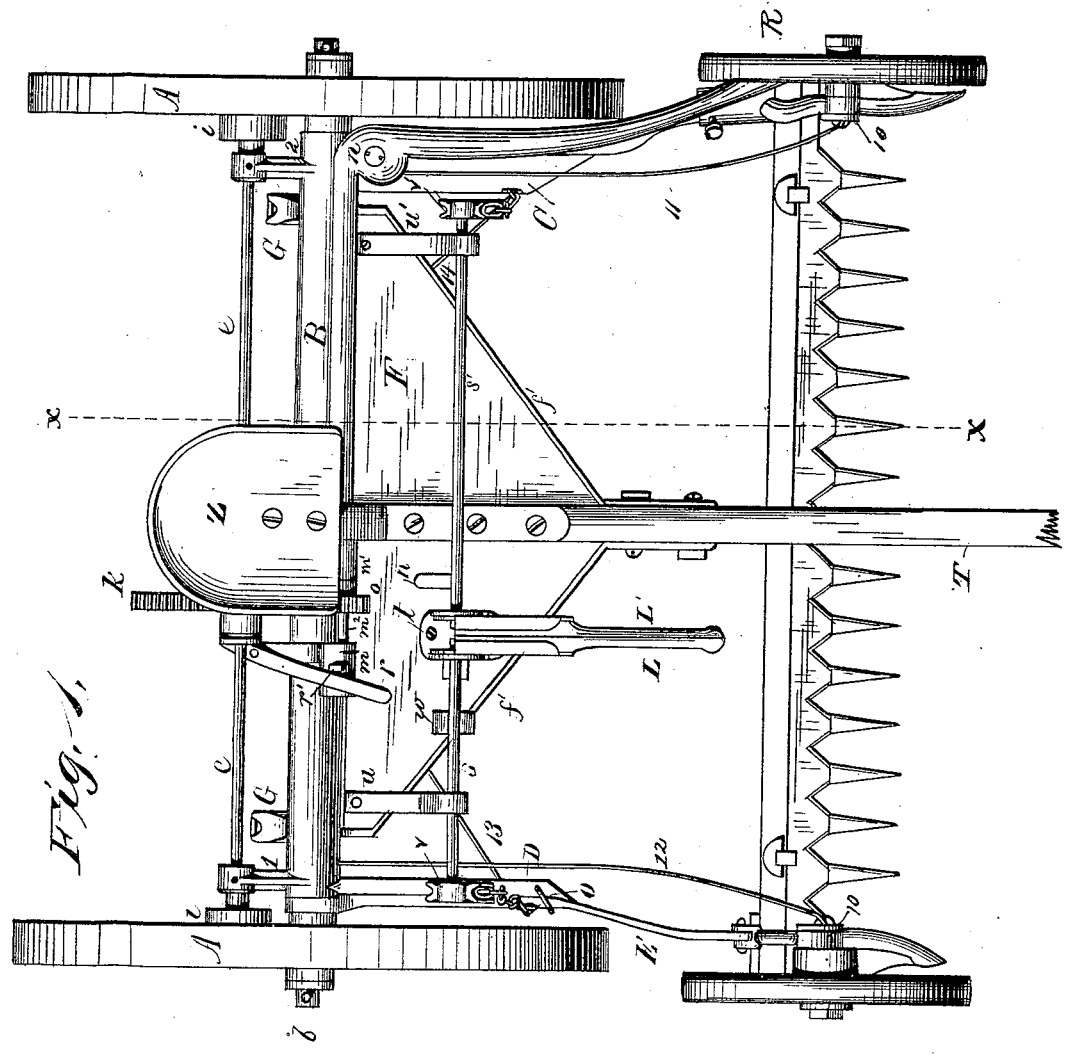
Figure 2:
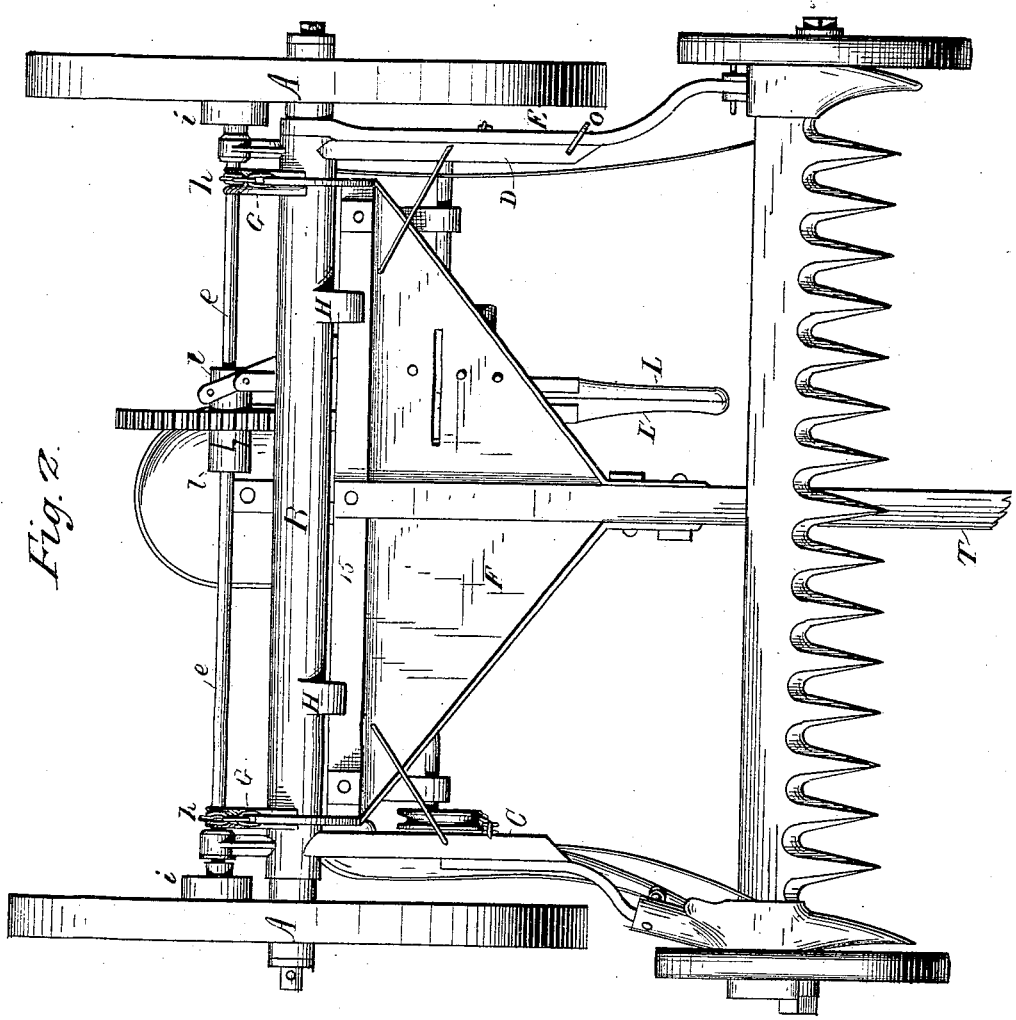
Figure 3:
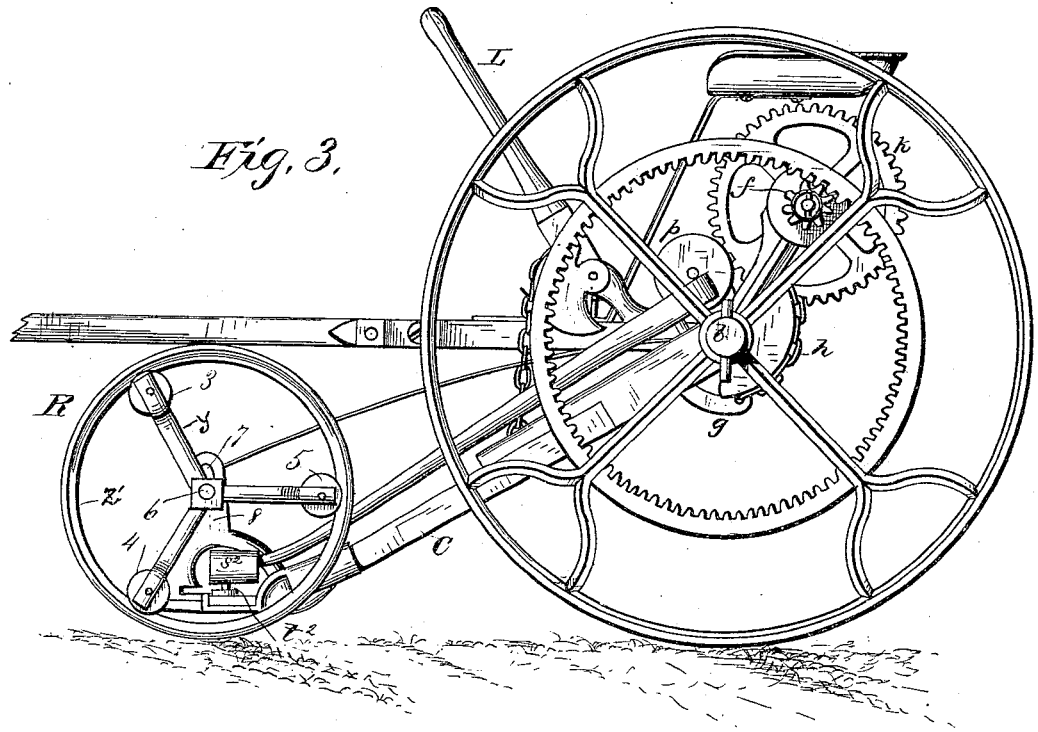
Figure 4:
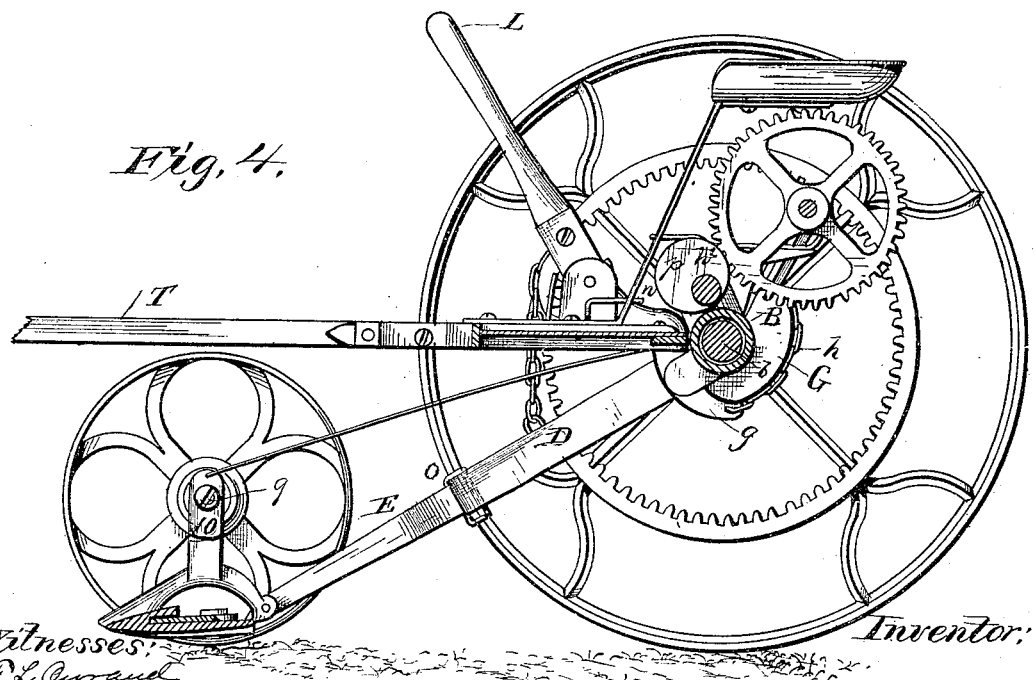

Figure 1 is a plan view of the machine; Fig. 2, a bottom plan view; Fig. 3, a side elevation; Fig. 4, a sectional view, in elevation, on the line $x\ x$ of Fig. 1; Fig. 5, a detail view of the bent arm or pitman with rock-shaft and its crank-shaft connection; Fig. 6, a detail view of the double-lever arrangement; Figs. 7 and 8, separate views of the housed ratchet and pawl located at each end of the back shaft; Fig. 9, a view of the stud used in hollow arm of pitman to connect the knife therewith.

Similar letters refer to similar parts throughout the several views.

A A represent the transporting-wheels, which are also driving-wheels for the sickle, and which are applied loosely on an axle, B. This is a sleeve-axle cast on spindle $b$, on the ends of which turn loosely the transporting-wheels.

C D are side arms cast on axle B. The axle B and spindle $b$ and the side arms, C and D, thus form one piece, and constitute the main frame of the machine.

1 and 2 are brackets or standards cast on axle B.

E represents a right side arm, the lower end of which is pivoted to the shoe at a point directly back of and as low as the finger-bar, and the upper end of which terminates in a collar embracing and moving loosely on spindle $b$. The side arms support the shoes and cutter-bar, while the upper brackets support the back shaft, $e$, on which are mounted the pinions $f$, meshing with the inner gears of the driving-wheels, the housed ratchets and pawls $i\ i'$, the cog-wheel $k$, and the clutch mechanism $l$. The axle supports the brackets $m\ m'$, carrying bearings for the short shaft $m^2$, on which is mounted pinion $o$ and crank-wheel $p$, by which motion is communicated to pitman and cutter-bar. On rearwardly-projecting arm of bracket $m$ is pivoted a hand-lever, $r$, a stop, $r'$, being provided therefor upon bracket $m$. This hand-lever is provided with a circular catch or fork at its end, resting in a groove in the hub of the cog-wheel $k$ on upper shaft, $e$, by which means the bent lever is thrown in and out of gear when desired.

F is a platform of triangular form, made of wood or metal, and attached to axle B in the following manner: The sides of the platform are bound with metallic strips $f'$, the inner ends of which terminate in curved arms $g\ g$, extending down and under axle B, and are there fastened to short chains $h\ h$, which are confined in the grooves of segmental plates G G, cast on the under and rear sides of axle B, and are attached to said plates at the upper ends of the grooves. These plates, instead of being cast with, may be keyed on or bolted to the frame. The platform is further supported on lugs H H, cast upon sleeve-axle B, and having downwardly-inclined faces. The common method is to attach the platform rigidly to the axle or frame of the machine, by which, with the additional weight of the driver and the seat, the tongue, and the mechanism for raising and lowering the cutter-bar, great weight and unequal strain are given the side arms and cutter-bar. By my arrangement of platform and connection with axle, as above described, which may be termed an "under draft," all weight of the platform and that added to it—as the weight of the driver—gives it a downward and outward movement, which, bearing on the grooved segmental plates G G at the back of the axle, and especially at the points where the chains $h\ h$, on which the platform is hung, are attached to said plates, above and back of the center of the axle, tends to relieve the forward part of the frame of all weight and consequent strain, and to render it possible to maintain the cutter-bar perfectly balanced, however heavy or uneven the draft may be. The weight upon the side arms thus being reduced, less power is needed to raise the levers to which they are connected, and thus their operation is made easy, quick, and efficient.

L L' represent said levers arranged upon the platform to the right of the driver's seat and in easy reach therefrom. L is the lever for raising the right side arm E and that end of the cutter-bar. Its lower end terminates in a half-circular notched plate rigidly fixed on the end of a short rotating rod, $s$, which rod bears loosely in one side of double bracket $t$, also in bracket $u$, and supports at its outer end grooved segment $v$, on which a chain is fixed, to the lower end of which is connected the side arm E. The left-hand lever L', the same in construction as lever L, is fixed to the separate rotating rod $s'$, having bearings in the opposite side of double bracket $t$ and bracket $u'$, and attached to segment $v'$ and chain connected to side arm C. The notches of the plates on lower ends of levers L and L' engage with a weighted foot-lever, M. This foot-lever consists of a foot-rest, a thin bar running at right angles therewith under and in a direct line with the rods $s$ and $s'$, and pivoted between arms attached to the outer right-hand side of double bracket $t$. Its inner end is moved up and down through a slot in the platform under the rods $s$ and $s'$, and by this arrangement a direct downward action is obtained, greatly increasing the facility of operation over the usual form of foot-levers. Its outer end is provided with a weight, $w$, grooved to form a bearing on right-hand rod $s$, as shown in Fig. 1. Thus each lever works independently of the other—lever L to raise the right-hand end of the cutter-bar, lever L' to raise the frame—and by their joint action the bar is raised entirely up from the ground when the machine is to be taken off the field. The foot-lever operates to fix either or both hand-levers at the position raised, and to release them when the parts are to be lowered.

The right side arm E is connected to the rigid arm D by a loose link, O; or a clevis or other similar form of clasp may be used for the purpose. The object of connecting said arm E to the frame by means of a link or its equivalent is to give the cutter-bar a free up-and-down movement independent of the movement of the frame, and thereby also produce a free and complete conformity of the blade to the varying surface of the ground. This is a great advantage over stirrups or other supports hung to segments or otherwise attached to the frame. The further object of preventing the cramping of the cutter-bar in its up-and-down movement is also attained by connecting this arm E at the lowest point possible to the cutter-bar and slipping the opposite end loosely upon the axle, as already described.

P is a bent or elbow-shaped arm, a substitute for the usual form of pitman, connected to the frame at or near the junction of the side arm C with the axle B by rock-shaft joint $w^2$, and its upper open end with crank-wheel $p$ by means of round-headed pin $p^2$. By this connection and the intermediate gearing on axle and upper back shaft, it receives its reciprocating motion from the driving-wheels. Its lower end is provided with a slotted hollow arm or sleeve, $s^2$, in which is placed to move loosely therein a pin, $s^3$, having a hole in its center to accommodate vertical stud $t^2$ on end of sickle, and thus it is connected with the end of the sickle and on a direct line therewith. These lower connections may be varied by use of a ball on the sickle in place of the vertical stud and a socket in place of the sleeve. By this construction and arrangement of the bent arm the serious objections of strain, jar, entanglement with grass, and too great complexity with other parts, &c., arising from placing the rock-shaft joint of the ordinary pitman, which gives to it its reciprocating motion, at or near the connections with the cutter-bar, are avoided. The placing of the bearings and connections of the cutter-bar in direct line therewith, as well as with the lead-wheels, I am better enabled to accomplish by the novel form of lead-wheel employed.

R represents the wheel in question. It has a metallic circular rim and an internal projecting flange or track, $z'$, on which run inner wheels, 3, 4, and 5, fixed in the split ends of spokes $y$, and provided with deep flanges to inclose each side of the rail. Said wheels 3, 4, and 5 are anti-friction wheels, which permit the rim to freely turn as the inner wheels come in contact with and are held by the shoe. The end of the cutter-bar is permitted to extend through the wheel, the sleeve end of the pitman comes down straight and rests directly on top of the cutter-bar, and the outer side of the shoe is at the inner side of the lead-wheel. The hub of the wheel moves freely on axle 6. This axle is provided with a nut and washer, and passes through a vertical slot, 7, in a standard, 8, extending from the shoe, and terminates on the inner side in a screw-head, 9. Between said screw-head and the inner side of vertical arm 8 is a movable plate, 10. Both lead-wheels are provided with these last-named features, by which the height of cut may be varied by raising the shoe and fixing it at the desired position by the use of the nut on the outside of the wheel. Both wheels also may have, if desired, the same form of rim and internal wheels. In mowing grain either wheel can be raised above the ground and fixed at proper height to prevent the rolling down of the grain by depressing one of the hand-levers so as to raise the lead-wheel a sufficient height, in which position it is held by the notches in the plates on the lower ends of the levers which engage with the foot-lever M. Side arms C and E both extend outwardly as they pass the driving-wheels. Arm C runs into the hollow end of the right-hand shoe, and may be fastened thereto in any suitable manner. Right side arm E is pivoted to the heel of the shoe, which is located right back of the cutter-bar and on a level therewith. Instead of the form shown, the joints connecting the said side arms and shoes may be made rocking, to give greater flexibility to the ends of the cutter-bar.

11 and 12 are guide-rods to throw the grass or grain to the center. Their lower ends are attached to the top of plates 10 and their upper ends to the axle B. 13 and 14 are also guide-rods extending in diagonally from side arms, C and D, for the same purpose.

T is a tongue slitted at its rear end to receive the metallic platform, and braced by the metallic strips $f'$, which bind the sides of the platform. The upper slitted end is bolted to the platform and the driver's seat Z to it. The under side is bolted to the horizontal bar 15, which in turn is screwed or bolted to the platform and rests upon the inclined lugs H of axle B.

Having thus described my invention, what I claim, and desire to secure by Letters Patent, is—

1. The combination of the platform provided with the rear curved arms, the axle provided with the grooved segmental plates and lugs, and their means of connection, substantially as described.

2. The combination of the independent levers L L', the separate rods $s\ s'$, their supporting-brackets, the side arms, C, D, and E, and the axle B, for jointly raising the cutter-bar and frame at the same time, substantially as described.

3. The foot-lever M, located in front of driver's seat, in combination with the platform provided with the slot directly under the lever-rods $s\ s'$, by which an easy and direct downward action of the foot-lever is obtained, substantially as described.

4. The single bent arm P, pivoted to the frame at or near the axle, its upper end connected directly to the crank-wheel, and its lower end connected directly to the sickle, substantially as described.

5. In a harvester, the combination, with the platform, of the sleeve-axle provided with the inclined lugs and the segmental plates, substantially as described.

6. In a harvester, the tongue slitted to receive the platform, in combination with said platform, the horizontal bar 15, the sleeve-axle B, and the lugs H H, on which the said platform rests, substantially as described.

7. The platform bound with metallic strips, the inner ends of which terminate in curved arms, in combination with suitable supports and the axle, substantially as described.

8. The combination of the foot-lever, independent hand-levers, side arms, connecting-rods, and finger-bar carrying lead-wheels, by which either lead-wheel is fixed at proper height, substantially as described.

In testimony whereof I affix my signature in presence of two witnesses.

DEWITT C. MARKHAM.

Witnesses:
  JNO. R. YOUNG,
  ROBERT MCMEEN.